Sept. 9, 1952 W. D. MACGEORGE 2,610,052
WEIGHING SYSTEM
Filed Jan. 15, 1949 2 SHEETS—SHEET 1

INVENTOR
WILLIAM D. MACGEORGE
BY
Barr, Borden & Fox
ATTORNEYS

Sept. 9, 1952 W. D. MACGEORGE 2,610,052
WEIGHING SYSTEM
Filed Jan. 15, 1949 2 SHEETS—SHEET 2

Inventor
WILLIAM D. MACGEORGE
By Barr, Borden & Fyr
Attorneys

Patented Sept. 9, 1952

2,610,052

UNITED STATES PATENT OFFICE 2,610,052

WEIGHING SYSTEM

William D. Macgeorge, Havertown, Pa., assignor to Automatic Temperature Control Co., Inc., Philadelphia, Pa., a corporation of Pennsylvania Application January 15, 1949, Serial No. 71,073

20 Claims. (Cl. 265—70)

This invention relates to weighing systems, and particularly to tare balance weighing systems.

There are many situations in which a container must be positioned to receive merchandise with an exact limitation on the weight of the merchandise or material placed in the container. With conventional systems of the prior art so far as known, it has been necessary to first weigh the container, and then to weigh the filled container and deduct the ascertained weight of the container from the total in order to ascertain the net weight of the material alone. This does not make for accuracy as the input of the merchandise is not controlled directly or automatically in response to weight input, and causes delays and constant minor corrections to account for slight variations in the weights of the containers used. Where the merchandise is fluent material it has caused considerable trouble by lack of synchronism between control of the inflowing material and attainment of the desired total weight placed in the container. These defects in the past have caused losses to the shipper, by either having too much or too little of the material in the filled container.

It is among the objects of this invention: to provide an automatic weighing system by which an exact amount of material can be placed in a container large enough to receive same substantially regardless of the weight or the fluctuations in weight of the containers being filled; to provide a tare balancing weighing system of efficiency and accuracy; to simplify automatic weighing systems; to provide an automatic filling and weighing system by which predetermined exact amounts of material can be placed in containers; to provide a simplified electronic system for weighing packaged materials; to provide a weighing system and filling control device whereby exact amounts of material can be automatically placed in a given container; to minimize losses to shippers either from shipping more or less than the agreed predetermined amount; to simplify and render automatic weighing systems more exact; to provide a weighing system in which all errors caused by changes in tare weight or of differences in platform scale settings as by accumulations of material thereon are automatically compensated to maintain exact measurings of applied weight; to provide remote indications on automatic weighing systems; and to provide other advantages as will become more apparent as the description proceeds.

In the accompanying drawings forming part of this description:

In carrying out the invention in a preferred but illustrative embodiment, an electrical network is provided in which a weight or scale transmitter device or agency incorporating one or more differential transformers is placed selectively in circuit with a first receiving differential transformer device positionable by a motor as a function of initial unbalance to establish a circuit balance after application of a tare weight in effect to electrically absorb or nullify such tare weight, and with a second receiver incorporating a differential transformer operated by a motor in the circuit as a function of a secondary unbalance caused only by the weight of input material in the container preliminary to shipping or storage. With this circuit various automatic control devices are associated to render the filling of the containers an automatic procedure.

Figure 1:
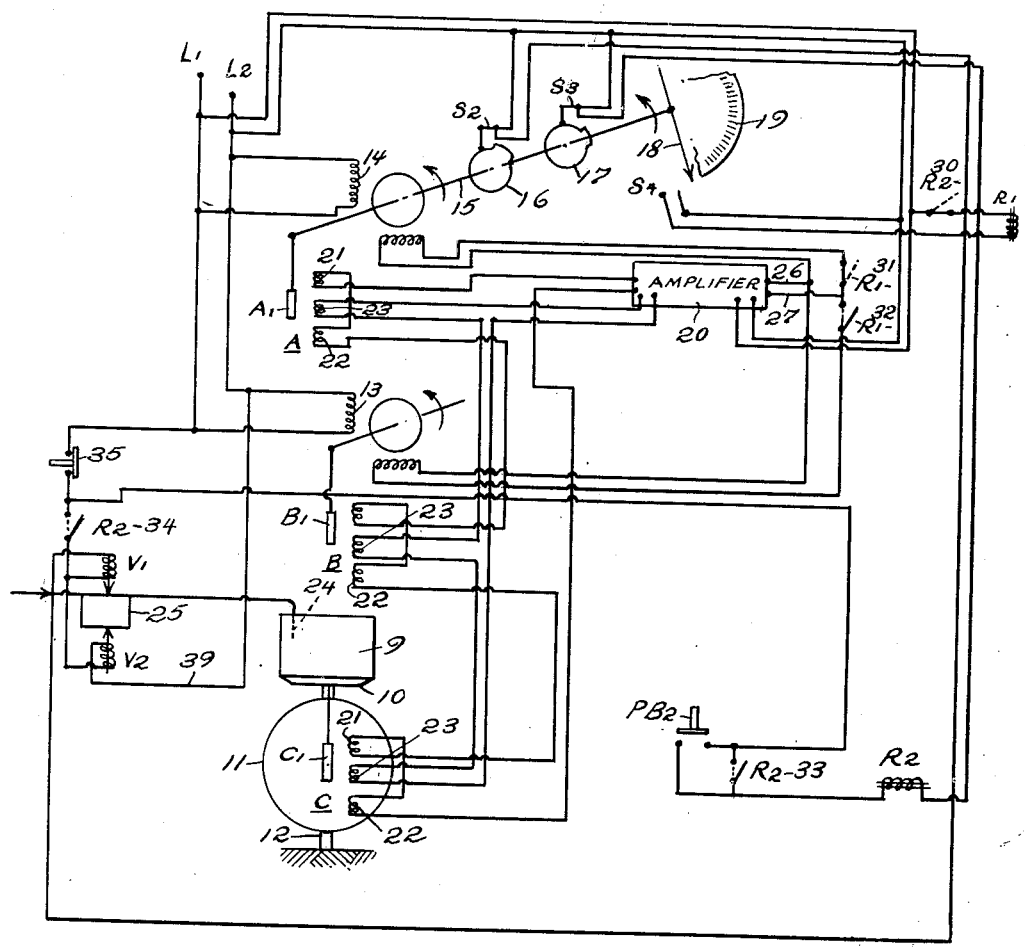
Fig. 1 represents diagrammatically one embodiment of the simplified weighing and control system of the invention.

Referring now to Fig. 1, there is disclosed a weighing platform or scale 10, mounted on a resilient support 11, constituting a load cell deformable as a function of applied load. The platform or scale 10 and load cell 11 together constitute a weighing agency upon which weight is imposed and by the movement of the platform or scale 10 the imposed weight is manifested. The platform of the weighing agency is arranged for the temporary support of a container 9, during the filling thereof. The load cell comprising the resilient support may be of any form, but preferably it comprises an axially short cylinder, supported on its peripheral edge at the bottom as at 12, and carrying the platform 10 at a point diametrically spaced from the support 12, so that under applied weight of container 9 and its contents the resilient ring 11 is deformed into generally oblate shape substantially as a linear function of the application of weight to the platform 10. While for simplicity of explanation but one resilient support or load cell 11 is disclosed it is to be understood that the platform is usually mounted on a plurality thereof, for stability and load-carrying ability. The platform 10 is suitably located as to be near or adjacent to a supply for the material to be packaged and stored or shipped. Illustratively only, the material will be assumed to be a fluent material such as a liquid or a powdered or granular material exemplified in flow by oil or the like, delivered through a nozzle 24 from a source of supply (not shown). Oil is a representative, but clearly not a limitative, illustration. Preferably, the oil supply leads to the nozzle 24 through a pair of electrically operated valves, which illustratively comprise solenoid-operated valve devices, respectively $V_1$, which controls the supply between a free flow and shunt, and $V_2$, which controls the flow through a shunt or bypass line 25, between a trickle and shut-off. In the automatic control of the flow through the nozzle, it will be understood that with both valves $V_1$ and $V_2$ open when the solenoids of both are energized, there is a free flow through the nozzle, and with de-energization of solenoid-operated valve $V_1$ by the circuit to be described, toward the end of the free flow when the container is almost full, the flow through nozzle 24 will be reduced to a trickle. The trickle furnishes the last few increments of fluid flow to the container in bringing the contents thereof to the final predetermined limit allotted to the instant container, which trickle is shut off by solenoid-operated valve $V_2$ by de-energization of its solenoid, when the incremental increase in the weight of material in the container attains the exact predetermined point, at which all flow through nozzle 24 is shut off because the container is exactly full.

Three differential transformers are provided in an electrical network, which transformers are, identified herein respectively as C, the transmitter or pick-up transformer associated with the applied weight, which may, and preferably does comprise a plurality of individual transformers for a conjoint output; B the first or tare weight receiver transformer associated with a tare weight compensating function; and A, the second or input weight transformer associated with designating or indicating the amplitude of applied weight and terminating the input thereof. These transformers, which are preferably identical, may be of any desired sort associated operably with an armature as a relatively movable mass, with the respective coils of the individual transformers so arranged as to provide a resultant output from the secondaries as a function of the relative positioning of the armatures and coils. Illustratively only, the transformers may be constructed and operated as shown in Macgeorge Patent No. 2,427,866. In the instant illustrative case, each transformer comprises secondaries 21 and 22, axially aligned with and spaced by a primary 23, with the secondaries coupled in series-bucking relation, and with each respective armature mass, to be identified, movable axially in preferably concentric relation with all of the coils of a respective transformer, so that the resultant transformer output varies from a substantially null output, when the inductive effect of the armature mass is equal on both secondaries, and an output of a given phase or an opposite phase in accordance with the direction of relative motion of the armature from the substantially null output position, in amplitude a function of the distance of the deviation of the armature mass from the null relative position.

The armature masses are respectively designated as $C_1$, similar in number to the transformers C and associated with and axially movable in response to movements of the platform 10 under loads thereon; $B_1$ associated with and axially movable in response to movement of the rotor of the tare servomotor 13 to be described; and $A_1$, associated with and axially movable in response to movement of the rotor of the weight servomotor 14 to be described. Of course, any relation of coils and armatures can be used which will function as a differential transformer within the contemplation of the invention. The servomotors with the parts actuated by same constitute servo mechanisms.

In order to account for the tare weight of the container 9, a reversible tare servomotor 13 is provided in the network, illustratively, but preferably of the two phase induction type, reversible in direction of angular running according to whether the current in the control winding thereof leads or lags the current in the power winding thereof, and which assumes a stationary condition when the input to the control winding becomes a substantial null. Motor 13 has its rotor operatively connected to the armature $B_1$ of the differential transformer B to control the output of the transformer.

In order to indicate and control the actual weight of the material, such as the illustrative fluid, actually disposed in the container 9, a reversible weight servomotor 14 is provided in the electrical network, comprising a second illustratively but preferably two phase induction motor. The rotor of motor 14 actuates a shaft 15 upon which there are mounted switching cam 16 controlling a switch $S_2$ in the network, and switching cam 17 controlling a switch $S_3$ in the network. Shaft 15 also carries the indicator or pointer 18 for sweeping a stationary preferably calibrated dial 19 having a zero point with reference to which the pointer moves across the calibrations to indicate the weight in the container 9 as it increases. A limit stop is provided at any desired point on the train of mechanism to prevent the pointer from moving clockwise beyond the zero point. Pointer 18 itself, or co-ordinated means on said shaft, when at the zero point of the indicator closes switch $S_4$ in the network and opens same as the pointer moves counterclockwise away from zero. The switches $S_2$ and $S_3$ and their respective controlling cams 16 and 17 are relatively adjustable from the front of the instrument in order to vary the predetermined points at which the material input is first reduced and finally terminated when container 9 has been exactly filled, if such controls are used, as is preferred, especially when fluent materials are used for disposal in the containers. Obviously, such switches can be used for signal purposes or for controlling related separate circuits.

A line circuit is established in the network from leads $L_1$ and $L_2$ which constantly energizes the power windings of the servomotors 13 and 14, in parallel, and which supplies an amplifier unit 20 in the network. The unit 20 supplies a reduced voltage, of the order, for instance, of 6 v. to all of the primaries 23 of the three transformers C, B and A in series, and receives the resultant output of all of the transformers, as the algebraic summation of the individual outputs, and has an amplified motor output through two leads respectively 26 and 27 in the network.

Relay $R_1$ has two switch elements, which respectively, in the open condition of relay $R_2$, close a circuit between the output motor leads 26 and 27 from the amplifier 20 to and through the control winding of the weigh motor 14, by normally closed switch element $R_1$—31, while the circuit from the motor leads 26 and 27 to and through control winding of tare motor 13 is through the normally open switch element $R_1$—32 of relay $R_1$. Switch $S_4$ is in circuit through the normally closed switch $R_2$—30 of the multiple latch-in relay R₂ and controls the energizing actuation of relay R₁. When switch S₄ is closed by suitable means coupled to or actuated by shaft 15 or pointer 18 whenever the pointer is at zero, and relay R₂ is de-energized, the connection of the motor leads from the amplifier is made to motor 13, and is broken to motor 14, and this is effected whenever relay R₂ is de-energized and therefore its switch component R₂—30 is in its normally closed position. However, whenever relay R₂ is energized, the normally closed switch element R₂—30 in the circuit of relay R₁ is pulled open, breaking the circuit through relay R₁, which drops out and the motor output from the amplifier automatically switches to the control winding of weigh motor 14. Thus, even with the indicator 18 at zero, energization of the actuating relay R₂ couples the motor lead output of the amplifier to the weigh motor 14, and disconnects it from the tare motor 13. With shaft 15 and pointer 18 at the limit of their clockwise motion, and switches S₂ and S₃ closed, a circuit is created from line L₁, stop push button 35, to one side of the start push button PB₂, and from the other side of the push button PB₂, through relay R₂, switch S₃, to line L₂. As at this time the normally open switch R₂—34 is still open, the solenoid-operated valves V₁ and V₂ are both closed. As soon as the start button PB₂, or the automatic equivalent thereof is actuated in response to the imposition of a container 9 on the platform 10, as by photoelectric actuation, or the like, as may be desired, a circuit is closed through relay R₂ which simultaneously pulls out the normally closed switch element R₂—30, dropping out the relay R₁, and pulls in the latching switch R₂—33 for latching in the relay R₂ and also pulls in the normally open switch R₂—34. Actuation of the latter closes circuits in the network simultaneously through both solenoids of the solenoid-operated valves, respectively V₁ and V₂, as follows: From line L₁ across stop switch 35, through switch R₂—34, solenoid of valve V₁, through switch S₂ to line L₂, and from the switch R₂—34 through solenoid of valve V₂ and connector 39 to line L₂. Coincident with the operation of both solenoids of the valves a free flow of the fluid from nozzle 24 into the container begins.

In the operation of the device, it will be assumed that the network and all circuits therein are energized through lines L₁ and L₂, no weight is on the platform, and all parts are in substantially neutral generally centered position, or at least in such relative position that the outputs of the transformers as a resultant are substantially null. As will be pointed out, this result can attach to actual null positioning of the respective armatures and coils of the transformers, or as a result of plus values in one or more and minus values in another. At this point the indicator 18 is at zero, held against further clockwise movement by the limiting stop and the switches S₂, S₃ and S₄ are closed. As the relay-controlled switch R₂—30 is normally closed, the relay R₁ is energized, switches R₁—31 and R₁—32 are reversed in direction so that the motor output leads 26 and 27, from the amplifier 20, are disconnected from the control winding of weigh motor 14, and connected to the control winding of the tare motor 13. As soon as this circuit arrangement is established, the tare motor is actuated in one direction or the other to change the output of transformer B in order to reestablish balance in the outputs of the several transformers A, B and C. Such unbalance may be occasioned by slight inaccuracies in the setting of any armature relative to its controlling movable agency, such, for instance, as more or less slight discrepancies between the initial and subsequent positions of the platform 10, occasioned, for instance, by a deposit of the material or other substances on the platform 10. At this time also the tare motor is free to adjust itself to rebalance the secondaries system in the network in the event that the previous return of the weigh motor to such angular setting of the indicator as to establish a zero setting has not been accompanied simultaneously by a return to balance of the outputs of the series of differential transformers. Owing to the physical stoppage of the shaft in a clockwise direction toward zero, there may still have been a residual unbalance in the transformer circuit which applies torque which impels the weigh motor to and urges it beyond the zero point in a clockwise direction, which urge is unsatisfied and which remains as secondaries unbalance. Such residual torque and unbalance are immediately subsequently nullified by the running of the tare motor 13 and change in the output of transformer B as soon as the motor lead output 26 and 27 is coupled thereto. At the conclusion of any great or small readjustment of the tare motor, the outputs of all secondaries in the circuit are relatively balanced, the output through motor leads 26 and 27 ceases, and the indicator is at zero. R₂ is open.

A container 9 is then placed upon the platform 10. It will be appreciated that this may be a step in a conveyor series and may be fully automatic, being instituted in any desired manner, as by and in response to a return of the system to balance after a filled container is removed. The removal may also, of course, be automatic by any desired mechanism, so that the filling and removal of the containers may be a fully automatic operation. It makes no particular difference, within the capacity of the system, what the weight of the container may be, or what differences exist between the weights of various containers in a series thereof. The application of the weight to the platform depresses same against the resilience of the support 11, which moves armature C₁ relative to the coils of transformer C, furnishing an output therefrom which unbalances the secondaries circuit containing all of the transformers. Owing to the connection of the motor leads to the tare motor 13, the latter runs to develop a cancelling or balancing voltage in the secondaries circuit which stops the motor 13 when the secondaries circuit is rebalanced. For illustration, it will be assumed that the output from the transmitter transformer C is a plus voltage, while that from the tare motor-controlled transformer B is a minus voltage. It will be understood that as the differential transformers are energized with A. C. the output of any given transformer is substantially null with substantially symmetrical disposition of its armature relative to the secondary coils, developing into an output of A phase or a signal of one sense of increasing amplitude as the armature moves relatively in one sense from the symmetrical substantially null output position, and developing into an output of B phase or a signal of opposite sense from the first mentioned signal of one sense of increasing amplitude as the armature moves relatively in the opposite sense from the symmetrical substantially null output position, and the A and B phases are substantially 180° apart. When referring to the plus and minus values of the respective outputs, these are obviously not D. C. values, but are A. C. phase relations. With one transformer, say transformer C, having an output of A phase, for instance, as a plus value, and another, say, tare controlled transformer B, having an output of B phase as a minus value, in the secondaries circuit, it will be seen that with equal amplitudes the resultant output will be substantially null, whereas with unequal amplitudes the secondaries circuit will be of the phase of the dominant amplitude and of amplitude substantially equal to the difference between the respective amplitudes. In the usual course the tare motor completes its running and rebalancing of the secondaries circuit in a short time interval, say, of the order of three-fifths of a second. In positioning the empty container 9 on the platform it has also been adjusted with reference to the nozzle 24 so that the two are juxtaposed for a filling operation. The yielding of the platform 10 in response to the applied weight has substantially a linear response in the change of output of the transmitter C. The tare motor 13 is a sort of floating member arranged for running whenever permitted so as to remove any and all unbalances that may exist or develop in the secondaries circuit. The container and the system are now ready for the filling operation and the ascertainment of the exact weight of the material placed in the container by the filling operation.

The filling and exact weighing is initiated by closing a circuit through relay $R_2$. Usually and preferably, the closing of this circuit will be part of an automatic operation incorporating a slight time delay, responsive, if desired, to the placing of the empty container 9 on the platform 10, such as by a photo-electric or like automatic circuit. To illustrate the system, a push button $PB_2$ is provided which can be manually actuated after the tare weight has been compensated for, or which may be actuated at the instant the empty container 9 is placed on the platform with an incorporated time delay permitting completion of the balancing running of the tare motor before the circuit through relay $R_2$ controlled by $PB_2$ is closed. Eventually then, the circuit is closed across $PB_2$, relay $R_2$ is pulled in, with three functions. It pulls out the normally closed switch $R_2$—30, thus opening the circuit through relay $R_1$, which restores the normal switch connections from the motor output 26 and 27 from amplifier 20 connecting same to the weigh motor 14, and disconnecting the tare motor 13, it closes or pulls in the normally open latch-in switch $R_2$—33, maintaining the circuit through relay $R_2$ after the switch $PB_2$ is released, and it pulls in the normally open switch $R_2$—34, thus energizing both solenoids of the solenoid-operated valves $V_1$ and $V_2$, to open the full flow of the fluid through nozzle 24 into the container.

At this instant the tare weight has been stored or disposed of as an electrical value, the platform 10 has been depressed from its initial setting to a new zero or datum setting, so that the actual weighing as far as the weigh motor is concerned is from this new datum level or setting, so that for all practical material weighing, the container is effectively weightless. As the material pours from the nozzle into the container, the platform starts to depress further under the increasing weight in the container and the transmitter, or transmitters, C begin to generate a signal. This signal, having illustratively a plus value, begins to unbalance the secondaries circuit, and effects a resultant input from the secondaries circuit into the amplifier 20. A current flows through the motor leads 26 and 27 to the weigh motor, which moves in angular running to indicate, by counterclockwise angular motion of the indicator, the weight in the container, and to establish by motion of the shaft 15 and coupled armature $A_1$, a minus value of output from transformer A, which continues to increase as long as the unbalance caused by the increased plus signal from transmitter C incident to filling the container continues. When the angular shaft 15 assumes a position close to the predetermined final angular position thereof according with the weight in the container for which it is predetermined, the advancing cam 16 engages and opens switch $S_2$. This opens the circuit through the solenoid of solenoid-operated switch $V_1$ only, which closes, reducing the flow through the nozzle 24 to a trickle. The final incremental addition of weight incident to complete filling of the container has moved the platform 10 the slight further amount which controls the transmitter C to furnish a small further plus value which continues to unbalance the secondaries circuit sufficiently as to cause the weigh motor 14 to travel by angular running the slight additional distance necessary to reach the final angular position thereof at which the indicator indicates the attained predetermined load or weight, and the cam 17 opens the switch $S_3$. Opening the switch $S_3$ opens the circuit through the solenoid of solenoid-operated valve $V_2$, which closes and shuts off the flow through the nozzle 24. At this point the container is filled with the predetermined weight of material and the input thereof stops, while the pointer is disposed opposite to the calibration on the dial representative of the predetermined weight of the material, regardless of the tare weight. As the circuit through the relay $R_2$ is controlled by the switch $S_3$, opening of the latter drops out the relay $R_2$. This drops in the normally closed relay switch $R_2$—30, and drops out the latching switch $R_2$—33, and the solenoid valve controlling switch $R_2$—34. As at this point the outputs of the transformers C, B, and A are in substantial balance, nothing further happens as long as the filled container continues to remain on the platform 10.

As soon as the filled container 9 is removed from the platform 10, the latter moves upwardly in response to the urge of the released spring 11, which, of course, moves the armature $C_1$ relative to the transformer and changes the output of the secondaries thereof, through a reduced plus value, to approximately a null output. As at this time the weigh motor-controlled receiving transformer A retains its attained minus value, the circuit is unbalanced, but in a different sense from the progressive unbalance associated with the filling procedure. The unbalance is therefore in the opposite sense and the motor output to the weigh motor 14 is reversed in phase, and the motor 14 therefore angularly runs in a reversed clockwise direction, moving the shaft and its associated elements in a clockwise direction, returning the indicator to the zero position at which the motor stops either with or without cessation of torque from the motor. In the usual case, a residual torque is present because the secondaries circuit is, at the moment, still unbalanced. In attaining this ultimate zero position in its return stroke, the cams have respectively closed the switches S3, energizing the circuit through the relay R2, as far at least as switch PB2, and S2 energizing the circuits of the solenoids of the solenoid-operated valves as far at least as switch R2—34. As noted, attainment of the zero indicator position is synchronized with closing of switch S4, and energization of the relay R1, which in responding disconnects the output motor leads from the weigh motor 14 and restores them to the tare motor 13. This then actuates its transformer to nullify any existing unbalance and automatically reconditions the apparatus for the reception of a second empty container 9 and the cycle is complete.

It will be seen that the entire procedure can readily be automatic functions of a complete system, or such intermediate portions thereof as may be desired may be made either manual or automatic. It will be clear, for instance, that although the automatic control of the filling is preferred, this can easily be accomplished by suitable valve or other manually controlled devices manipulated by the operator as he watches the progress of the indicator relative to the dial, or in response to a visual or audible signal actuated at a desired point in the indicator travel.

Although the system as disclosed is preferred for many purposes, it may not be the most expedient for certain types of filling and weighing operations. Thus, for instance, it may be desired to have an indication of the last portion of the weight applied to the container as a plus or minus value. In this case, the fact of overweight as well as underweight is indicated in order to permit the withdrawal of the excess, or the input of the deficiency to bring the total input weight to that which is desired. While this is, of course, applicable also to the fluent types of materials, it is also applicable to solid non-granular and non-flowing materials. These also, of course, may be used with the system of Fig. 1.

Figure 2:
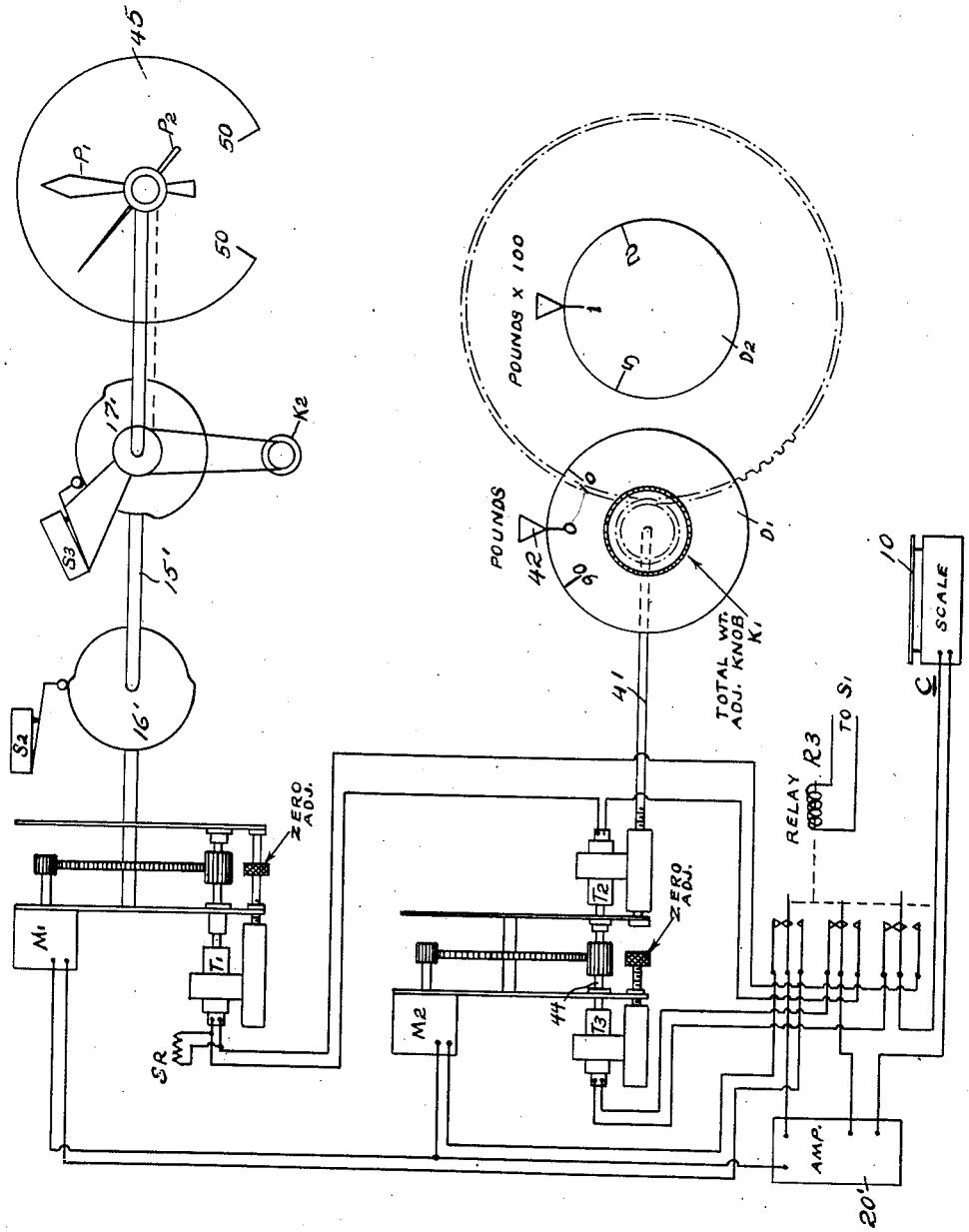
Fig. 2 represents diagrammatically a modified embodiment thereof.

An illustrative embodiment of such modified form of the invention is disclosed in Fig. 2. In addition to one or a plurality of differential transformers C having a conjoint output from the platform 10 of the weighing platform, three additional differential transformers are provided. The first comprises $T_1$, the relative armature position and the consequent relative output of which is controlled by the running of servomotor $M_1$ in angular motion, which drives shaft $15'$ carrying cams $16'$ and $17'$ controlling switches $S_2$ and $S_3$, respectively, and which also carries pointer $P_1$. This all constitutes a servo mechanism. The second transformer comprises $T_2$, in which the position of the transformer coils relative to the armature is controlled by the rotations of a threaded shaft 41 controlled by a knob $K_1$, from the front of the instrument. Shaft 41 carries a dial $D_1$ calibrated in selected terms, for instance, "pounds" from one to one hundred, illustratively, and angularly adjustable with reference to a datum line 42, and geared to a second dial $D_2$ calibrated, for instance, in terms of "pounds × one hundred" up to say five hundred pounds. It will be understood that, in an illustrative assembly, one rotation of dial $D_1$, representing one hundred pounds, will move dial $D_2$ from zero (coincident with "5") to "1," representing one hundred pounds on dial $D_2$. Rotation of shaft 41 in moving the transformer coils with reference to the armature will cause a voltage output from the secondaries of $T_2$, or a change in an existing voltage output therefrom.

Differential transformer $T_3$, the tare weight transformer, is disposed in alignment with transformer $T_2$, and the armatures of both transformers are mounted on a common threaded shaft 44 for axial adjustment equally and simultaneously in both transformers $T_3$ and $T_2$ by servomotor $M_2$, together constituting a servo mechanism. All of the primaries of all transformers are coupled in series to a source of A. C. in the electrical network (not shown in Fig. 2, for clarity).

Through the multiple switching arrangements shown controlled by relay $R_3$, the transformer secondaries outputs are selectively coupled together in one of two series in the network. In the first series, in the deenergized condition of relay $R_3$, the transformers C of the platform scale 10 are in a circuit with the tare weight transformer $T_3$ only, and the resultant output passing to the amplifier unit 20' in the network is operative on motor $M_2$, through normally closed switch of $R_3$ which drives shaft 44 until the initial unbalance caused by the tare weight on the scale platform is balanced by the opposing output of transformer $T_3$, at which point the motor $M_2$ stops. As noted, this has also moved the armature of transformer $T_2$. When switch $S_1$ is closed, energizing relay $R_3$, the switch reversal couples the outputs of the platform transformers C with the outputs of transformers $T_2$ and $T_1$, and the amplified output passing from the amplifier unit 20' is effective on the reversing motor $M_1$ through the normally open switch of $R_3$ to move the shaft $15'$ angularly to indicate the weight of the contents of the container on the platform of the scale.

With all three transformers, $T_1$, $T_2$ and $T_3$ adjusted for zero setting in relation to their mechanisms and dials; with the scale platform empty, and with switch $S_1$ energized for pulling in the relay $R_3$, the system will be set for reading the weight of any mass placed upon the scale platform 10', providing that this mass does not exceed the maximum dial readings of the indicator 45. In the illustrative case as disclosed in Fig. 2, the indicator 45 reads "50–0–50" pounds. This is of course, illustrative, but is for the purpose of indicating only the last fifty pounds of mass placed on the scale for the dial settings as adjusted by the knob $K_1$. As noted, the given dial calibration can be of any other value, showing plus and minus values relative to the zero point, as, for instance, "10–0–10"; "1–0–1"; or the like, or whole values, such as from "0–100"; "0–1000"; etc., depending upon whether the value to be indicated is the last few units of a greater mass, or the entire mass itself. Moreover, in order to spread the readings, when only the last few units of a total mass are to be read with accuracy, a shunt resistance SR can be provided for usually selective insertion into and removal from a desired portion of the transformer windings. Thus, the main indicator transformer $T_1$ is shunted down to indicate the desired portion of the whole mass.

Under the conditions of the circuit outlined above, if an illustrative mass of ten pounds is placed on the platform 10 and the setting of the instrument is reading zero, and assuming the relay $R_3$ to have previously been pulled in, by actuation of switch $S_1$ the scale transformers will emit an instantaneously unbalanced and unnullified signal voltage which is proportional to the mass. This signal will be fed to the amplifier 20' which will run the balancing motor $M_1$ until the transformer $T_1$ produces an equal voltage, substantially 180 degrees out of phase with the scale signal, resulting eventually in zero input to the amplifier, and this, of course, gives a zero output to the control winding of motor $M_1$, causing the motor to stop and the indicator to indicate the actual ten pounds of the ten pound mass on the platform 10.

If it is now desired to indicate the last fifty pounds plus or minus of two hundred pounds, illustratively, knob $K_1$ is adjusted until the dial $D_2$ reads "2," and the dial $D_1$ reads zero. This moves the coils of transformer $T_2$ relative to the instantaneously relatively fixed armature thereof, just enough out of balance as to give out a signal exactly sufficient to balance the signal which will be generated by the transformers of the scale or platform when a mass of two hundred pounds is placed on the scale, and at substantially 180 degrees out of phase with such scale-generated potential. When the scale platform 10 is unloaded, the pointer $P_1$ will be driven all the way off of the minus side of the dial by the action of the unbalance of the transformers in the circuit, i. e. $T_1$, $T_2$ and the scale transformers C. As the scale or platform 10 is loaded, its signal tends to balance the $T_2$ signal, and when this balance occurs the main pointer $P_1$ will read zero.

If it is now desired to place a container on the scale and to fill the container with a desired weight of a given material or substance and to weigh only the input substance, the tare weight of the container will be automatically compensated by de-energizing the switch $S_1$, and thus the relay $R_3$, so that when the scale platform is loaded by an empty container, as 9 (not shown in Fig. 2), the signal generated by the transformers of the platform unbalances the transformer circuit, now including only $T_3$, and runs the motor $M_2$ until transformer $T_3$ emits a substantially cancelling voltage, when motor $M_2$ stops. As movement of the armature for $T_3$ to generate the cancelling voltage has been accompanied by a movement of the armature of $T_2$, a greater relative amount of voltage is generated than has been previously accomplished in the adjustments of the shaft 41 in adjusting dials $D_1$ and $D_2$. With the parts locked in this position, $S_1$ is energized, energizing relay $R_3$, which switches the scale transformers C and amplifier 20' in series with $T_1$ and $T_2$, and the transformer $T_2$ is out of balance to an extent equal to the weight of the container plus the desired dial setting of dials $D_1$ and $D_2$. In order to secure zero reading of the indicator, it is necessary to load the scale platform 10 by filling the container with the desired mass of the material to be weighed. This reading is accomplished by merely closing the $S_1$ contact. This takes motor $M_2$ and transformer $T_3$ out of the circuit.

The switches $S_2$ and $S_3$, and cams 16' and 17' are control switches. The switch $S_2$ is rigidly fixed to trip at zero on the indicator dial. The switch $S_3$ is adjustable by knob $K_2$ around the periphery of the shaft 15'. These switches can be used in various ways, such as in controlling the flow of the substance entering the succession of containers, as in the nozzle controls of Fig. 1 (by the solenoid-operated valves $V_1$ and $V_2$), or for indication of the near zero point, and the ultimate full point or zero setting of the indicator, or for other signal or control purposes.

It will be seen that in both forms of the invention indication, control and automatic tare adjustments are effected, in a simplified, accurate and thoroughly practical manner.

Having thus described my invention, I claim:

1. A weighing system comprising an electrical network, an elastic load cell deformable as a function of applied load, a weight-receiving scale mounted to deliver a scale load to the load cell, a transmitter having an output-controlling member mounted for actuation as a function of the deformation of the load cell for producing an electrical scale signal of one sense proportional to weight applied to said scale, an indicator, motor means in the network operable through running in angular motion for actuating the indicator, and a receiver in the network operated as a function of indicator movement for producing an electrical indicator signal of opposite sense from and substantially balancing that of the scale signal, and said network having connections for a power source and energizing said motor to actuate the indicator in response to unbalance between the scale and indicator signals, said network comprising means for stopping the motor when the respective signals are in substantial balance to stop the indicator with a setting indicating applied weight on said scale.

2. A weighing system comprising an electrical network, a scale, a transmitter operatively associated with said scale for producing a scale signal of given sense in said network, an indicator, first motor means in said network for actuating said indicator, a receiver operated as a function of indicator movement for producing an indication signal of opposite sense to that of the scale signal in said network, a second motor means in said network, means operated by the second motor means for producing a tare signal in said network of opposite sense to that of the scale signal, coupling means in said network selectively operable for coupling the transmitter and tare signals with the second motor means to drive the latter during unbalance between said transmitter and tare signals and to stop said second motor when said signals are substantially in balance as a tare weight response in said network, said coupling means being selectively operable to uncouple said indicator and tare signals from said second motor means and to couple the indicator signal, tare signal and scale signal with the said first motor means to actuate the latter during unbalance between these signals and to energize an indication signal augmenting the tare signal to cancel the scale signal and stop said first motor means while also effecting an indication of the actual weight minus the tare weight on said scale.

3. A weighing system comprising a weigh motor, a tare motor, and a weight responsive agency, differential transformers operatively associated with each of the motors and the agency and disposed for variable outputs from their secondaries when the associated respective motors and agency are actuated, circuit means coupling the outputs of all of the transformers in series, means selectively coupling the outputs of all of the transformers in operative relation to the tare motor so that unbalance of the system incident to placing a tare weight on the weight-responsive agency causes actuation of the tare motor only for rebalancing the secondaries output circuit, said last mentioned means operative selectively to couple the outputs of all of the transformers in operative relation to the weigh motor so that unbalance of the system incident to placing material to be weighed on the weight responsive agency causes actuation of the weigh motor only to indicate the weight applied without regard to the tare weight.

4. A weighing system comprising a weight-receiving agency, a first differential transformer assembly associated operatively with the agency to generate a signal proportional to the weight imposed on the agency, a reversible tare motor, a second differential transformer assembly associated with the tare motor to generate a signal proportional to the running of the tare motor, a reversible weigh motor, indicating means operably associated with the weigh motor, circuit means coupling the outputs of the respective transformers, amplifying means for energizing a motor controlling circuit as a function of unbalance of the circuit means, and means for alternately connecting the motor-controlling circuit with the tare motor and with the weigh motor, whereby a tare weight on said agency generates a signal which unbalances the circuit of the secondaries which is rebalanced and nullified by the running of the tare motor and the generation of a signal cancelling that of the first transformer assembly, and whereby a weight additive to the tare weight on the agency generates a signal which unbalances the circuit of the secondaries nullified by the running of the weigh motor to position the indicating means to indicate the weight additive of the tare weight as an indication thereof.

5. A weighing system comprising a reversible weighing motor, indicating means operable by the motor and having a datum position, a weight-receiving agency, electrical means connecting the agency and the weighing motor to run the motor in one direction to indicate weight applied to the agency, means in the system for oppositely running said motor to return the indicator to its datum position when weight is removed from the agency and means comprising a servo mechanism interposed between the agency and the weighing motor to receive and store as an electrical value a tare weight applied to the agency whereby the operation of the weighing motor starts from the datum position for the weight of material disposed on the weight-receiving agency independent of the tare weight.

6. A weighing system comprising a reversible weighing motor, indicating means operably associated with the motor and including an effectively zero datum point from which weight measurement is effected, a weighing scale, an electrical system operably connected with the weighing scale and with the weighing motor for actuating same in one direction as a function of weight applied to the weighing scale means in the system for oppositely running said motor to return the indicator to its zero datum point when weight is removed from the weighing scale, and means comprising a servo mechanism in the electrical system for electrically absorbing the tare weight applied to the weighing scale while maintaining said indicating means at the said zero datum point whereby it is only the weight added to the tare weight which is indicated by said indicating means.

7. A weghing system comprising a reversible weighing motor, indicating means operably associated with the motor and including an effectively zero datum point from which weight measurement is effected, a weighing scale, an electrical system operably connected with the weighing scale and with the weighing motor for actuating same in one direction as a function of weight applied to the weighing scale and in the other direction as a function of removal of previously applied weight, and signal means comprising a servo mechanism in the electrical system for electrically absorbing the tare weight applied to the weighing scale as an electrical signal while maintaining said indicating means at the said zero datum point whereby it is only the weight added to the tare weight which is indicated by said indicating means, said means in the electrical system comprising an electric motor.

8. A weighing system comprising a reversible weighing motor, indicating means operably associated with the motor and including an effectively zero datum point from which weight measurement is effected, a weighing scale, an electrical system operably connected with the weighing scale and with the weighing motor for actuating same in one direction as a function of weight applied to the weighing scale and in the other direction as a function of removal of previously applied weight, and signal means in the electrical system for electrically absorbing the tare weight applied to the weighing scale as an electrical value while maintaining said indicating means at the said zero datum point whereby it is only the weight added to the tare weight which is indicated by said indicating means, said means in the electrical system comprising a separate electric motor and circuit controlling means substituting the said separate motor for said weighing motor during the tare weighing.

9. A weighing system comprising a weigh motor, indicating means operably associated with the weigh motor, electrical signal producing means the output of which is controlled by the running of the weigh motor, a weighing scale, a second electrical signal producing means operably associated with the weighing scale the output of which is controlled by the weight on the weighing scale, said respective signals being of such respective senses as to be mutually cancelling, a network including the outputs of the respective signal producing means, a tare motor, a third electrical signal producing means the output of which is controlled by the running of the tare motor, said third electrical signal producing means disposed to introduce its output into said network with a signal cancelling in sense to the signal from the second signal producing means, and means in said network operative after the weigh motor has attained an effectively zero datum point for said indicating means for causing unbalance of the network to become operative to run the tare motor to produce a signal re-establishing balance in the network as a function of the unbalance occasioned by the imposition of a tare weight on said weighing scale, said last means operative thereafter to cause unbalance of the network to become operative to run the weigh motor to produce a signal re-establishing balance in the network as a function of unbalance occasioned by the imposition of weight additive to the tare weight on the weighing scale to indicate by said indicating means starting from the said effectively zero datum point the actual weight applied to the weighing scale other than the tare weight.

10. A weighing system comprising a reversible weigh motor, indicating means operably associated with the weigh motor, electrical signal producing means the output of which is controlled by the running of the weigh motor, a weighing scale, a second electrical signal producing means operably associated with the weighing scale the output of which is controlled by the weight on the weighing scale, said respective signals being of such respective senses as to be mutually cancelling, a network including the outputs of the respective signal producing means, a tare motor, a third electrical signal producing means the output of which is controlled by the running of the tare motor, said third electrical signal producing means disposed to introduce its output into said network with a signal cancelling in sense to the signal from the second signal producing means, circuit-controlling means in said network operative after the weigh motor has attained an effectively zero datum point for said indicating means for causing unbalance of the network to become operative to run the tare motor to produce a signal re-establishing balance in the network as a function of the unbalance occasioned by the imposition of a tare weight on said weighing scale, said last means operative thereafter to cause unbalance of the network to become operative to run the weigh motor to produce a signal re-establishing balance in the network as a function of unbalance occasioned by the imposition of weight additive to the tare weight on the weighing scale to indicate by said indicating means starting from the said effectively zero datum point the actual weight applied to the weighing scale other than the tare weight, said network and said respective electrical signalling means comprising means for reversing the weigh motor to return the indicating means to said effective zero position when measured weight is removed from the weighing scale as a result of unbalance of the network because of the changed signal emanating from the second electrical signal producing means, and means for automatically actuating the said circuit-controlling means in the network when the indicating means attains said effectively zero datum point.

11. A weighing system comprising a weigh motor, a shaft driven by the motor, an indicator positioned by said shaft, a cam on said shaft, a network comprising a switch operatively associated with the cam to control a circuit in the network operative at a predetermined angular position of the shaft, a differential transformer comprising two relatively movable members one comprising an armature and the other comprising coils in said network, means operatively associating one of said members with said shaft to vary the relation of the members as a function of shaft positioning to produce and vary a signal from the transformer, a tare motor, a second differential transformer comprising two relatively movable members one comprising an armature and the other comprising coils in said network, means operatively associating one of said members of the second transformer with said tare motor to vary the relation of the members as a function of tare motor running, a weighing scale, a third differential transformer comprising two relatively movable members one comprising an armature and the other comprising coils in said network, means operatively associating one of said members of said third transformer with said weighing scale to vary the relation of the members thereof as a function of weight applied to said weighing scale, an amplifier in said network arranged to develop a motor controlling current as a result of net resultant unbalance of the signals from all of the said transformers, circuit controlling means in said network synchronized with the said shaft positioning to direct said motor controlling current to said tare motor to run same in a direction such as to rebalance the net resultant transformer signals in response to the application of a tare weight on said weighing scale without running said weigh motor to disturb the zero setting of the indicator, and means in the network operative to direct said motor controlling current to said weigh motor to move the indicator from zero by running said weigh motor in a direction such as to rebalance the net resultant transformer signals in response to added weight on the weighing scale.

12. A weighing system comprising four differential transformers, each of which comprises two members of which one is an armature and the other is a plurality of coils, a weighing scale operatively associated with a first transformer to change the electrical relationship of the two members thereof with the application of weight on said scale, a tare motor operatively associated with the second and third transformers so as to change the electrical relationship of the respective two members of both transformers as functions of tare motor running, a weigh motor operatively associated with the fourth transformer to change the electrical relationship of the two members thereof as a function of weigh motor running, circuit controlling means, an amplifier, means placing both motors and all of the transformers in a network with said circuit controlling means and amplifier whereby selectively the outputs of the first transformer and the second transformer are coupled to run the tare motor as a function of unbalance between said outputs to synchronously establish balance therebetween and change the electrical relationship of the members of the third transformer as a function of tare weight, and whereby the outputs of the first, third and fourth transformer are coupled to run the weigh motor as a function of unbalance between said last mentioned outputs to establish balance therebetween and to indicate the net weight on the scale.

13. A weighing system comprising four differential transformers, each of which comprises two members of which one is an armature and the other is a plurality of coils, a weighing scale operatively associated with a first transformer to change the electrical relationship of the two members thereof with the application of weight on said scale, a tare motor operatively associated with the second and third transformers so as to change the electrical relationship of the respective two members of both transformers as functions of tare motor running, a reversible weigh motor operatively associated with the fourth transformer to change the electrical relationship of the two members thereof as a function of weigh motor running, circuit controlling means, an amplifier, means placing both motors and all of the transformers in a network with said circuit controlling means and amplifier whereby selectively the outputs of the first transformer and the second transformer are coupled to run the tare motor as a function of unbalance between said outputs to synchronously establish balance therebetween and change the electrical relationship of the members of the third transformer as a function of tare weight, whereby the outputs of the first, third and fourth transformer are coupled to run the weigh motor as a function of unbalance between said last mentioned outputs to establish balance therebetween and to indicate the net weight on the scale, and separate adjustable means operatively associated with the third transformer for changing the electrical relationship of the respective members thereof as a function of adjustment of said separate means to place in the network an electrical value according with the degree of adjustment to predetermine the weight value at which the running of the weigh motor re-establishes balance in the network pursuant to the placing of weight on the scale.

14. A weighing system comprising four differential transformers each of which comprises two members, one comprising an armature and the other comprising a plurality of coils and arranged for an output varying from null to an output of voltages of opposite phases according to the direction of relative movement of the members from the null output relative position, a weighing scale operatively associated with one member of a first transformer to generate a signal as a function of application of weight on the scale, a tare motor, means coupling the tare motor with a member of each of the second and third transformers for synchronous changes of the electrical relationship of the respective two members thereof to generate signals therefrom, a weigh motor operatively associated with one of the members of the fourth transformer, an indicator operatively associated with the weigh motor, a network, and means in the network for selectively coupling the outputs of the first and second transformers to run the tare motor as a function of tare weight on the scale and of the consequent unbalance between the signals of the first and second transformers, and said means in the network selectively operable to couple the outputs of the first, third and fourth transformers to run the weigh motor to actuate the indicator as a function of unbalance between the outputs of the first, third and fourth transformers incident to weight additive to tare weight on the scale to rebalance said outputs.

15. A weighing system comprising four differential transformers each of which comprises two members, one comprising an armature and the other comprising a plurality of coils and arranged for an output varying from null to an output of voltages of opposite phases according to the direction of relative movement of the members from the null output relative position, a weighing scale operatively associated with one member of a first transformer to generate a signal as a function of application of weight on the scale, a tare motor, means coupling the tare motor with a member of each of the second and third transformers for synchronous changes of the electrical relationship of the respective two members thereof to generate signals therefrom, a weigh motor operatively associated with one of the members of the fourth transformer, an indicator operatively associated with the weigh motor, a network, means in the network for selectively coupling the outputs of the first and second transformers to run the tare motor as a function of tare weight on the scale and of the consequent unbalance between the signals of the first and second transformers, said means in the network selectively operable to couple the outputs of the first, third and fourth transformers to run the weigh motor to actuate the indicator as a function of unbalance between the outputs of the first, third and fourth transformers incident to weight additive to tare weight on the scale to rebalance said outputs, a second indicator, means for adjusting said second indicator, and means coupling the second indicator to the other of said two members of the third transformer to change the electrical relationship of the said two members thereof to predetermine a signal from the said third transformer electrically equivalent to the predetermined weight indicated by the said second indicator to predeterminedly unbalance the circuit containing the signals from the first, third and fourth transformers to cause the weigh motor to run a predetermined amount in rebalancing the output circuit according with the said predetermination.

16. A weighing system comprising four differential transformers each of which comprises two members one comprising a plurality of coils and the other comprising an armature mass coaxial with the coils and arranged for an output varying from null to an output of voltages of opposite phases according to the direction of relative axial movement of the members from the null output relative axial position, a network, a weighing scale, means coupling one of the members of the first transformer to the scale to generate a signal therefrom as a function of weight applied to the scale, means mounting the second and third transformers in spaced coaxial relation, a tare motor, means coupling one member of each of the said second and third transformers together and to the tare motor for simultaneous movement of the said one member relative to the other member of each of said second and third transformers to equally displace said one member to generate similar signals in both of said second and third transformers as functions of tare motor running, a weigh motor operatively associated with one of said members of the fourth transformer, indicating means operated by the weigh motor as a function of weigh motor running, means in the network for establishing a circuit containing the outputs of the first and second transformers and for running the tare motor as a function of unbalance between the signals in said circuit to rebalance the circuit by running the tare motor as a function of tare weight on the scale, said tare motor running generating a signal in the third transformer, and means in the network for establishing a circuit containing the outputs of the first, third and fourth transformers and for running the weigh motor as a function of resultant unbalance of said last circuit to rebalance said circuit and actuate the indicator a degree that is a function of net weight applied to the scale.

17. A weighing system comprising four differential transformers each of which comprises two members one comprising a plurality of coils and the other comprising an armature mass coaxial with the coils and arranged for an output varying from null to an output of voltages of opposite phases according to the direction of relative axial movement of the members from the null output relative axial position, a network, a weighing scale, means coupling one of the members of the first transformer to the scale to generate a signal therefrom as a function of weight applied to the scale, means mounting the second and third transformers in spaced coaxial relation, a tare motor, means coupling one member of each of the said second and third transformers together and to the tare motor for simultaneous movement of the said one member relative to the other member of each of said second and third transformers to equally displace said one member to generate similar signals in both of said second and third transformers as functions of tare motor running, a weigh motor operatively associated with one of said members of the fourth transformer, indicating means operated by the weigh motor as a function of weigh motor running, means in the network for establishing a circuit containing the outputs of the first and second transformers and for running the tare motor as a function of unbalance between the signals in the said circuit to rebalance the circuit by running the tare motor as a function of tare weight on the scale, said tare motor running generating a signal in the third transformer, means in the network for establishing a circuit containing the outputs of the first, third and fourth transformers and for running the weigh motor as a function of resultant unbalance of said last circuit to rebalance said circuit and actuate the indicator a degree that is a function of net weight applied to the scale, a manually controlled second indicator, and means operatively coupling said second indicator with the other of said two members of the third transformer to change the relation of the said two members to generate a signal proportional to the setting of the indicator to predeterminedly unbalance said second mentioned circuit to place a predetermined weight as an electrical value into said second circuit to cause the weigh motor to move the first indicator to an equivalent setting when the predetermined weight is on the scale.

18. A weighing system comprising a weight receiving means, means producing an electrical signal proportional to the weight applied to said weight receiving means, a first servomotor, a first servomotor-controlled electrical signal opposing said first signal, indicating means, circuit controlling means, a second servomotor coupled to said indicating and circuit controlling means, a second servomotor-controlled electrical signal opposing said first signal, a network combining the respective signals whereby tare weight on the weight receiving means actuates the first servomotor, and added weight to the tare weight actuates the second servomotor.

19. A weighing system comprising an electrical network, an elastic load cell deformable as a function of applied load, a weight-receiving scale mounted to deliver a scale load to the load cell, a transmitter comprising a movable element transformer in the network, the movable element of which is mounted for actuation as a function of the deformation of the load cell for producing an electrical scale signal proportional in amplitude to the weight applied to said scale, an indicator, motor means in the network operable through running in angular motion for actuating the indicator, a receiver comprising a movable element transformer in the network, the movable element of which is mounted for actuation as a function of the angular motion of said motor means, said motor running as long as there is unbalance between the outputs of the transmitter and receiver and stopping when balance is attained in the network.

20. A weighing system comprising an electrical network, an elastic load cell deformable as a function of applied load, a weight-receiving scale mounted to deliver a scale load to the load cell, a transmitter comprising a movable element transformer in the network, the movable element of which is mounted for actuation as a function of the deformation of the load cell for producing an electrical scale signal proportional in amplitude to the weight applied to said scale, an indicator, motor means in the network operable through running in angular motion for actuating the indicator, a receiver comprising a movable element transformer in the network, the movable element of which is mounted for actuation as a function of the angular motion of said motor means, said motor running as long as there is unbalance between the outputs of the transmitter and receiver and stopping when balance is attained in the network, and said transmitter disposed to reversely unbalance said network when the load is removed to reversely run said motor means until the indicator returns to datum, while the network is again rebalanced by the receiver.

WILLIAM MACGEORGE.

REFERENCES CITED

The following references are of record in the file of this patent:

UNITED STATES PATENTS

| Number | Name | Date |
| --- | --- | --- |
| 1,952,171 | Jones | Mar. 27, 1934 |
| 2,081,367 | Nicholson | May 25, 1937 |
| 2,281,453 | Petersen | Apr. 28, 1942 |
| 2,302,458 | Miner | Nov. 17, 1942 |
| 2,407,513 | Pounds | Sept. 10, 1946 |
| 2,421,222 | Schaevitz | May 27, 1947 |
| 2,489,899 | Kniazuk | Nov. 29, 1949 |